US010528939B2

(12) United States Patent
Mohamed

(10) Patent No.: US 10,528,939 B2
(45) Date of Patent: Jan. 7, 2020

(54) TELEPHONE-BASED PAYMENTS USING TOKENS

(71) Applicant: Bank of America Corporation, Charlotte, NC (US)

(72) Inventor: Zafer Mohamed, Charlotte, NC (US)

(73) Assignee: Bank of American Corporation, Charlotte, NC (US)

(*) Notice: Subject to any disclaimer, the term of this patent is extended or adjusted under 35 U.S.C. 154(b) by 766 days.

(21) Appl. No.: 14/884,950

(22) Filed: Oct. 16, 2015

(65) Prior Publication Data
US 2017/0109747 A1 Apr. 20, 2017

(51) Int. Cl.
G06Q 20/20 (2012.01)
G06Q 20/32 (2012.01)
G06Q 20/36 (2012.01)
G06Q 20/38 (2012.01)

(52) U.S. Cl.
CPC ........... *G06Q 20/325* (2013.01); *G06Q 20/20* (2013.01); *G06Q 20/3674* (2013.01); *G06Q 20/3821* (2013.01)

(58) Field of Classification Search
CPC ...................................................... G06Q 20/20
See application file for complete search history.

(56) References Cited

U.S. PATENT DOCUMENTS

| | | | |
|---|---|---|---|
| 5,613,012 A * | 3/1997 | Hoffman | G06F 21/32 |
| | | | 235/380 |
| 5,790,677 A * | 8/1998 | Fox | G06Q 20/00 |
| | | | 380/277 |
| 6,938,019 B1 * | 8/2005 | Uzo | G06Q 20/06 |
| | | | 380/268 |
| 7,003,493 B2 | 2/2006 | Weichert et al. | |
| 7,014,107 B2 | 3/2006 | Singer et al. | |
| 7,676,433 B1 * | 3/2010 | Ross | G06Q 20/02 |
| | | | 705/37 |
| 7,707,120 B2 * | 4/2010 | Dominguez | G06Q 20/02 |
| | | | 705/78 |
| 8,457,663 B2 | 6/2013 | Ramakrishna et al. | |
| 8,700,004 B2 | 4/2014 | Gorthi et al. | |
| 8,775,312 B2 | 7/2014 | Dayalan | |
| 9,123,040 B2 * | 9/2015 | Kelly | G06Q 20/382 |
| 9,721,147 B1 * | 8/2017 | Kapczynski | G06Q 50/265 |
| 2001/0055393 A1 * | 12/2001 | Sundaravel | G06F 17/30241 |
| | | | 380/258 |
| 2012/0173431 A1 | 7/2012 | Ritchie et al. | |
| 2012/0246071 A1 | 9/2012 | Jain et al. | |

(Continued)

*Primary Examiner* — William J Jacob
(74) *Attorney, Agent, or Firm* — Michael A. Springs

(57) ABSTRACT

According to one embodiment, a system includes a memory comprising instructions, an interface, and a processor communicatively coupled to the memory and the interface. The interface is configured to receive, from a user telephone device, a request to complete a transaction using a token associated with the user telephone device. The processor is configured, when executing the instructions, to determine one or more tokens associated with the user telephone device. The interface is further configured to send, to an issuer server, a verification request for the token, and receive, in response to the verification request, translated information associated with the token. The processor is further configured to complete the transaction using the translated information.

14 Claims, 10 Drawing Sheets

(56) References Cited

U.S. PATENT DOCUMENTS

| | | | |
|---|---|---|---|
| 2012/0278236 A1 | 11/2012 | Jain et al. | |
| 2013/0110658 A1* | 5/2013 | Lyman | G06Q 20/20 705/18 |
| 2013/0145172 A1* | 6/2013 | Shablygin | G06F 21/33 713/185 |
| 2013/0191227 A1* | 7/2013 | Pasa | G06Q 20/3674 705/14.73 |
| 2013/0246261 A1* | 9/2013 | Purves | G06Q 20/105 705/41 |
| 2013/0297504 A1* | 11/2013 | Nwokolo | G06Q 20/363 705/41 |
| 2014/0025958 A1* | 1/2014 | Calman | G06Q 20/3224 713/189 |
| 2014/0074637 A1* | 3/2014 | Hammad | G06Q 20/12 705/21 |
| 2015/0248673 A1* | 9/2015 | Almohri | G06Q 20/38215 705/39 |
| 2016/0301680 A1* | 10/2016 | Main | H04W 12/08 |

* cited by examiner

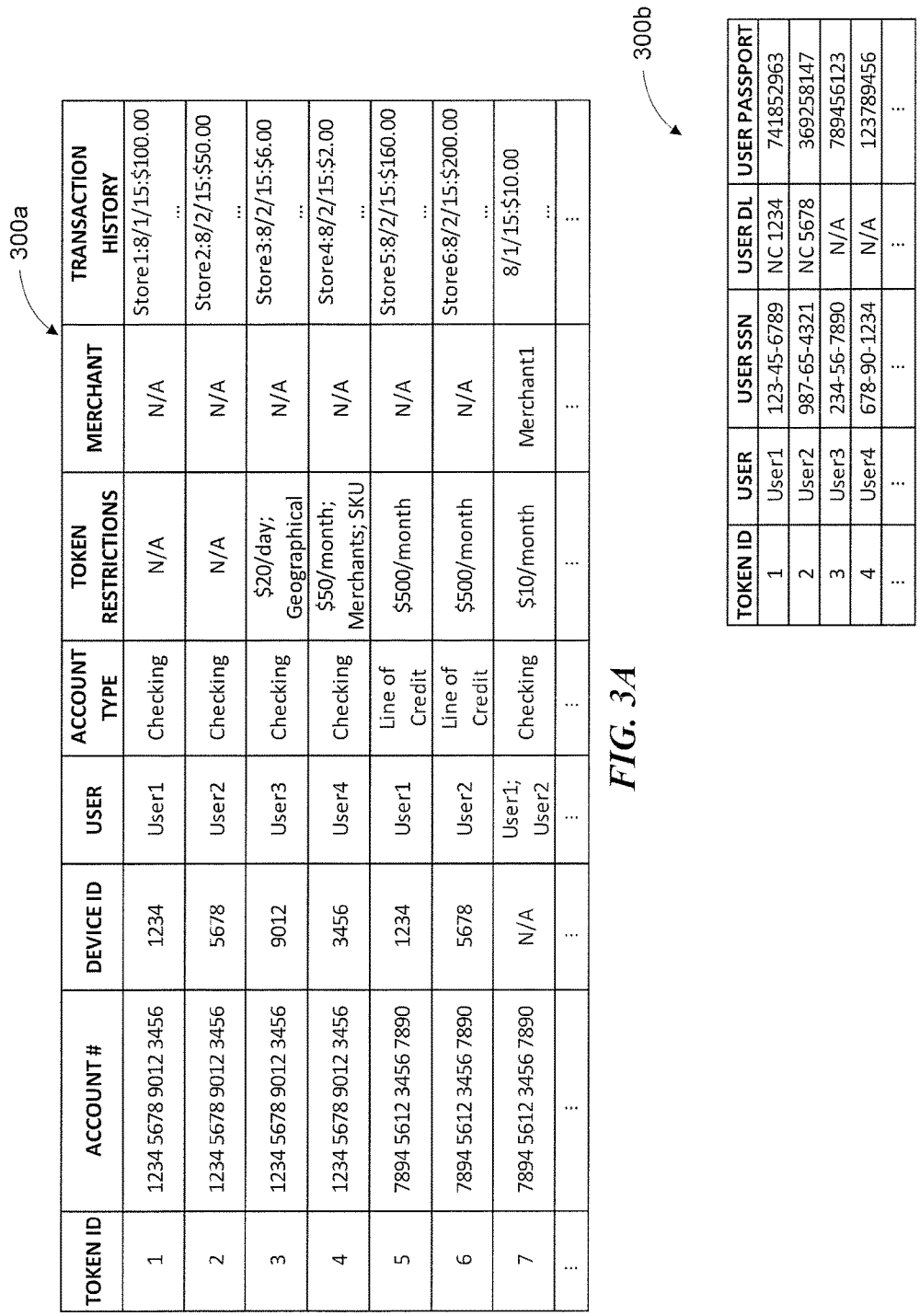

FIG. 3A

| TOKEN ID | ACCOUNT # | DEVICE ID | USER | ACCOUNT TYPE | TOKEN RESTRICTIONS | MERCHANT | TRANSACTION HISTORY |
|---|---|---|---|---|---|---|---|
| 1 | 1234 5678 9012 3456 | 1234 | User1 | Checking | N/A | N/A | Store1:8/1/15:$100.00 ... |
| 2 | 1234 5678 9012 3456 | 5678 | User2 | Checking | N/A | N/A | Store2:8/2/15:$50.00 |
| 3 | 1234 5678 9012 3456 | 9012 | User3 | Checking | $20/day; Geographical | N/A | Store3:8/2/15:$6.00 ... |
| 4 | 1234 5678 9012 3456 | 3456 | User4 | Checking | $50/month; Merchants; SKU | N/A | Store4:8/2/15:$2.00 ... |
| 5 | 7894 5612 3456 7890 | 1234 | User1 | Line of Credit | $500/month | N/A | Store5:8/2/15:$160.00 |
| 6 | 7894 5612 3456 7890 | 5678 | User2 | Line of Credit | $500/month | N/A | Store6:8/2/15:$200.00 ... |
| 7 | 7894 5612 3456 7890 | N/A | User1; User2 | Checking | $10/month | Merchant1 | 8/1/15:$10.00 |
| ... | ... | ... | ... | ... | ... | ... | ... |

| TOKEN ID | USER | USER SSN | USER DL | USER PASSPORT |
|---|---|---|---|---|
| 1 | User1 | 123-45-6789 | NC 1234 | 741852963 |
| 2 | User2 | 987-65-4321 | NC 5678 | 369258147 |
| 3 | User3 | 234-56-7890 | N/A | 789456123 |
| 4 | User4 | 678-90-1234 | N/A | 123789456 |
| ... | ... | ... | ... | ... |

FIG. 3B

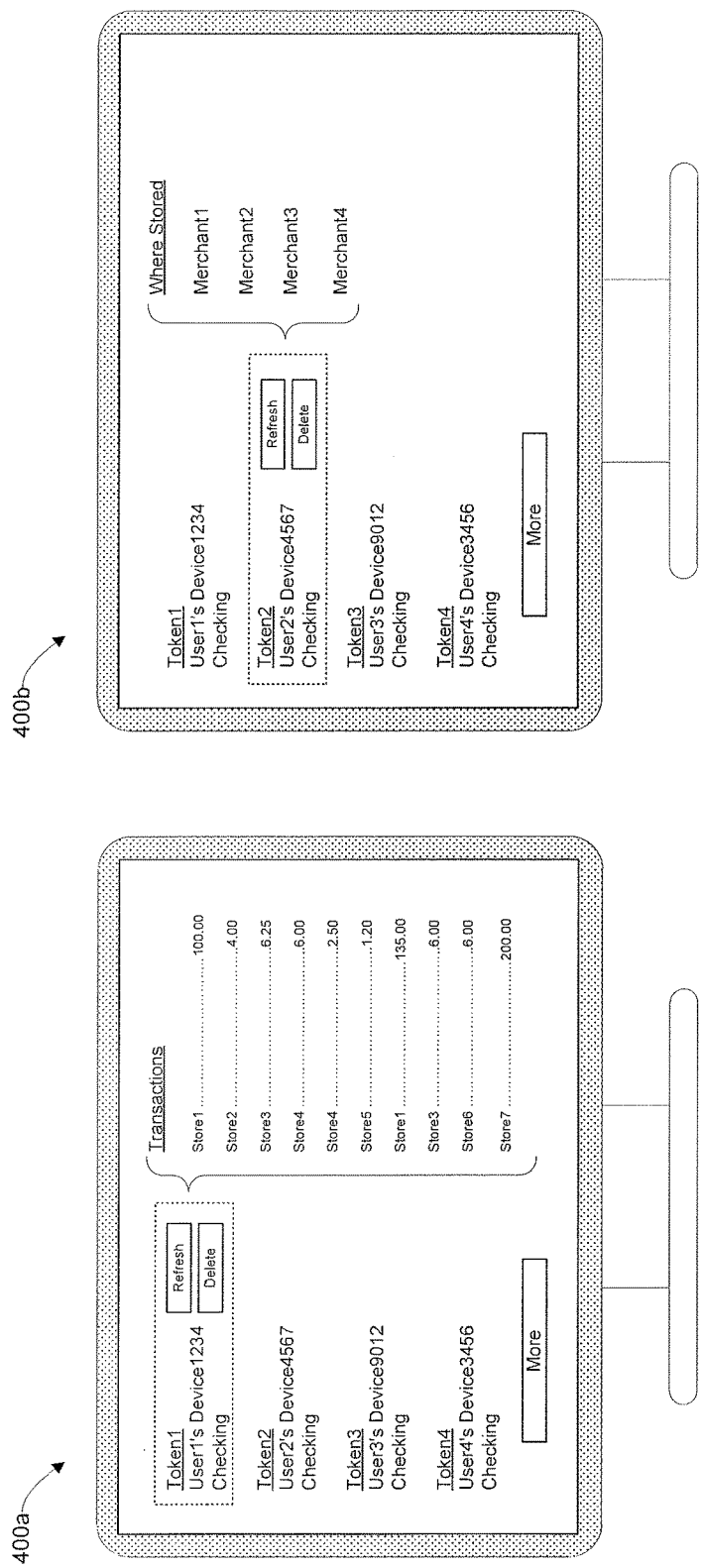

TELEPHONE-BASED PAYMENTS USING TOKENS

TECHNICAL FIELD

This disclosure relates generally to the tokenization of information, and more particularly to the usage of tokens for telephone-based payments.

BACKGROUND

Transactions that take place over a network may include the use of personal sensitive data, such as personal identification information or financial account information. This sensitive data may be targeted by unauthorized individuals such as hackers. For example, in an online transaction, a user's identification information and/or financial account information may be transmitted to a merchant for use in completing the transaction. This information may be intercepted during transmission or may be accessed by unauthorized individuals after it is stored on databases associated with the merchant, creating the potential for identity or monetary theft.

SUMMARY OF THE DISCLOSURE

In accordance with the present disclosure, disadvantages and problems associated with telephone-based payments may be reduced or eliminated.

According to one embodiment, a system includes a memory comprising instructions, an interface, and a processor communicatively coupled to the memory and the interface. The interface is configured to receive, from a user telephone device, a request to complete a transaction using a token associated with the user telephone device. The processor is configured, when executing the instructions, to determine one or more tokens associated with the user telephone device. The interface is further configured to send, to an issuer server, a verification request for the token, and receive, in response to the verification request, translated information associated with the token. The processor is further configured to complete the transaction using the translated information.

According to one embodiment, a method is provided that comprises the steps of receiving, from a user telephone device, a request to complete a transaction using a token associated with the user telephone device, determining one or more tokens associated with the user telephone device, sending, to an issuer server, a verification request for the token, receiving, in response to the verification request, translated information associated with the token, and completing the transaction using the translated information.

According to one embodiment, a computer-readable medium comprising instructions is provided. The instructions are configured when executed to receive, from a user telephone device, a request to complete a transaction using a token associated with the user telephone device, determine one or more tokens associated with the user telephone device, send, to an issuer server, a verification request for the token, receive, in response to the verification request, translated information associated with the token, and complete the transaction using the translated information.

Technical advantages of certain embodiments of the present disclosure include providing more secure electronic transactions by using tokens for telephone-based payments. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which:

FIGS. 3A-3B illustrate example token records of a database in accordance with embodiments of the present disclosure;

FIGS. 4A-4B illustrate example user interfaces associated with token records in accordance with embodiments of the present disclosure;

DETAILED DESCRIPTION

Figure 1:
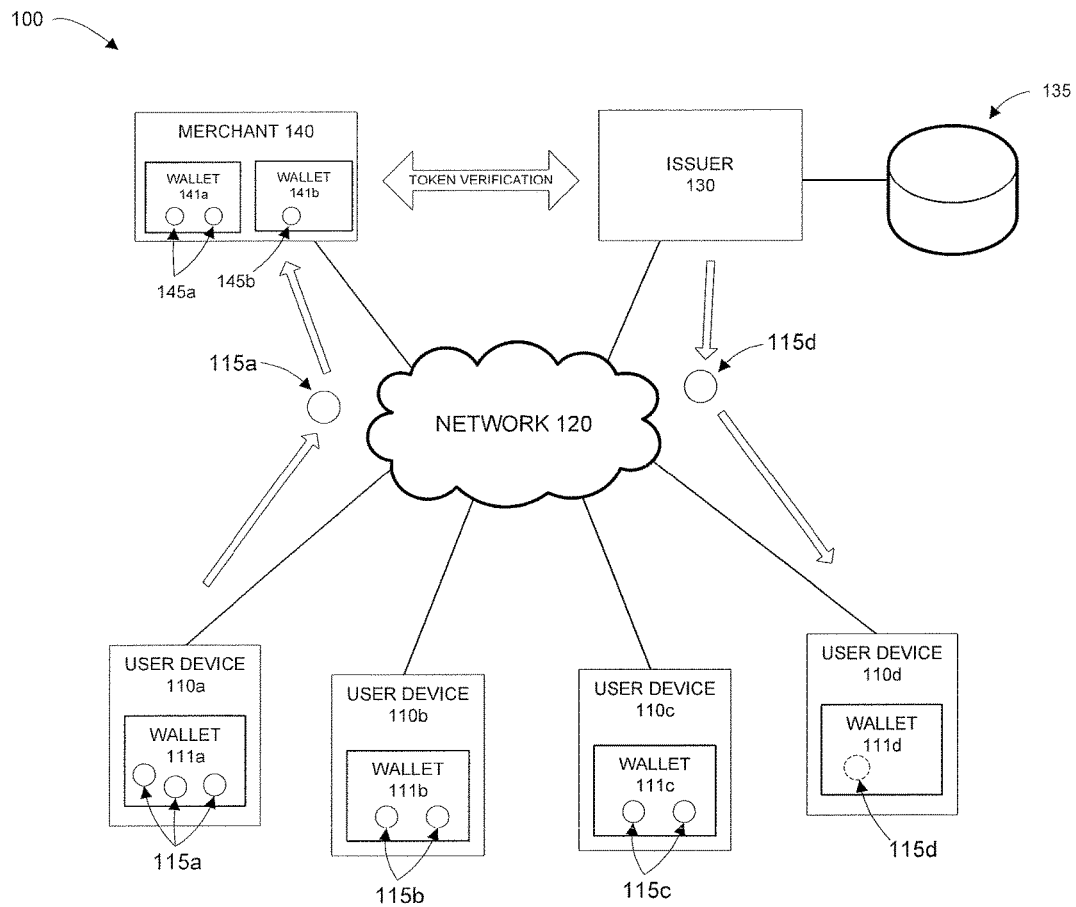
FIG. 1 illustrates an example system utilizing tokenization of sensitive personal information in accordance with embodiments the present disclosure.

The present disclosure describes systems and methods for tokenizing personal information, such as financial account information, governmental account information, or other sensitive user information. Tokenization may refer to the use of non-exploitable information in place of sensitive information that may be exploitable. When a token is presented and verified, the sensitive information may be exchanged therefor by a secure token issuer. In particular embodiments of the present disclosure, for instance, a token comprising non-sensitive data may be provided for the completion of electronic transactions in lieu of providing personal sensitive information, such as financial account information or personal identification information. Tokens according to the present disclosure may thus take the place of debit cards, credit cards, identification cards, and the like. For example, instead of providing a debit card number to a merchant to complete a transaction, a token comprising information corresponding to an account number and/or routing number of the checking account may be provided. As another example, instead of storing checking account information with a merchant to complete recurring transactions, a token comprising information corresponding to the checking account (e.g., an account number and/or routing number of the checking account) may be stored. The sensitive information (with which the tokens according to the present disclosure may correspond) may be stored in a central, secure location that provides the information in response to token verification requests (e.g., from merchants attempting to complete transactions using tokens). By tokenizing such types of sensitive user information and storing the sensitive information in a centralized record system in accordance with embodiments of the present disclosure, such information may be more secure and less vulnerable to misappropriation or theft by unauthorized individuals, such as hackers.

In particular embodiments, the information may be stored in a digital wallet on a user device or on a server (e.g., a merchant server). A digital wallet may refer to a portion of storage on a user device or server that includes digital information analogous to information that maybe kept in a user's wallet. As an example, a digital wallet may store personal information for a user that is similar to the information on a user's driver's license, passport, tax return, a personal identification number (PIN), or the like. As another example, a digital wallet may store financial account information for a user, such as checking account information, credit account information, or other information that links to other types of financial accounts (e.g., investment accounts). Furthermore, in particular embodiments, a centralized record system may be kept for all tokens issued by an issuer, which may include the collection of information underlying each token (e.g., the sensitive personal information), information related to where each token is stored or used (e.g., which user devices or servers are storing each particular token), and information associated with the usage of each token (e.g., transaction histories).

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-11, where like numbers are used to indicate like and corresponding parts.

FIG. 1 illustrates an example system 100 utilizing tokenization of sensitive personal information in accordance with embodiments the present disclosure. In particular, system 100 includes user devices 110 performing one or more transactions using tokens over network 120, using issuer server 130 and merchant server 140. User devices 110 may include any suitable computing device that may be used to perform transactions over network 140. User devices 110 may include mobile computing devices with wireless network connection capabilities (e.g., wireless-fidelity (WI-FI), and/or BLUETOOTH capabilities). For example, user devices 120 may include laptop computers, smartphones, or tablet computers. User devices 110 may also include non-mobile devices such as desktop computers. Network 120 may include any suitable technique for communicably coupling user devices 110 with issuer server 130 and merchant server 140. For example, network 120 may include an ad-hoc network, an intranet, an extranet, a virtual private network (VPN), a wired or wireless local area network (LAN), wide area network (WAN), metropolitan area network (MAN), a portion of the Internet, a portion of the Public Switched Telephone Network (PSTN), a portion of a cellular telephone network, or any combination thereof. Issuer server 130 may include any suitable device configured to issue tokens 115 associated with one or more user devices 110, and may generate and store information associated with such tokens 115 in database 135 (including the information to be translated in the token verification process (e.g., the personal data associated with each particular token)) and information regarding the usage of each token (e.g., transaction histories for the tokens)), as described below. In certain embodiments, each token 115 may be associated with a particular user account and a particular user device 110. Further, in certain embodiments, issuer server 130 may be associated with the holder of the user account with which tokens 115 are associated. For instance, issuer server 130 may be associated with the financial institution or bank that holds a checking account with which a token 115 is associated. Issuer server 130 may also participate in verification operations for tokens 115 with one or more merchant servers 140 in connection with user transactions, as described below. Merchant server 140 may include any suitable device configured to perform user transactions using tokens 115, and/or participate in verification operations with issuer server 130 for tokens 115 presented by user devices 110 to merchant server 140 during such transactions, as described below.

In operation, for example, a user device 110 (e.g., user device 110d) may issue a request to issuer sever 130 to create a token 115 (e.g., token 115d) for use with the particular user device 110. The token 115d may be associated with a particular user account that is serviced by issuer server 130 (or an associated server), such as a financial account, governmental information account, or other user data account, and may be created such that it may only be used in conjunction with the particular user device 110. The token 115, in certain embodiments, may represent sensitive information associated with the user (e.g., financial account information) as a substitution therefore. In other words, token 115 may include non-sensitive, non-exploitable data that is representative of the sensitive data. Once generated, the token 115 may be stored on user device 110 or on a merchant server 140 for later use. In some embodiments, the token 115 may be stored in a digital wallet 111 located on the user device 110, or in a digital wallet 141 located at a merchant server 140. After token 115 has been generated, a record associated with the token may be created in database 135. The record may include information about token 115 (e.g., which user, user device, account, or the like are associated with the token) and/or information associated with the usage of the token 115 (e.g., transaction histories).

Once the token 115 is generated and stored, it may be used to participate in one or more transaction with merchant server 140. In certain embodiments, the token 115 (e.g., token 115a from digital wallet 111a of user device 110a) may be used in lieu of the sensitive information that it represents. For instance, where token 115a represents financial account information associated with a user of user device 110a (e.g., checking account information), token 115a may be provided to merchant server 140 for payment in lieu of the financial account information. In certain embodiments, instead of providing the token 115 from user device 110 during a transaction, the token 115 may be stored at the merchant server 140 already in a digital wallet 141 associated with the user, and the user of user device 110 may select from the one or more tokens stored After receiving a token 115 at merchant server 140 during a transaction, merchant server 140 may send a verification request to issuer server 130. The request may ask issuer server 130 to translate the information contained in token 115. For example, where token 115 is associated with financial account information, the request from merchant server 140 may ask issuer server 130 to provide the financial account information (i.e., translated information) in exchange for the token 115. In certain embodiments, due to the sensitive nature of the translated information, the request may be sent to issuer server 130 using a secure connection between merchant server 140 and issuer server 130 to prevent unauthorized access to the translated information. Issuer server 130, after receiving the verification request from merchant server 140, may then verify that the token 115 is authentic (e.g., by verifying that the token was sent by the user device 110 associated with the particular token 115) and, if it is authentic, may provide the translated sensitive information to merchant server 140 in response. Merchant server 140 may accordingly use the translated information (the financial account information) to complete one or more portions of the transaction with user device 110.

Modifications, additions, or omissions may be made to FIG. 1 without departing from the scope of the present disclosure. For example, FIG. 1 illustrates a particular configuration of user devices 110 with digital wallets 111 storing tokens 115 and merchant server 140 with digital wallets 141 containing tokens 145. However, it will be understood that any suitable configuration of token generation, storage, and use is contemplated by the present disclosure. As another example, although illustrated as a single server, issuer server 130 or merchant server 140 may include a plurality of servers in certain embodiments. Similarly, although illustrated as a single database, database 135 may include a plurality of databases in certain embodiments.

Figure 2:
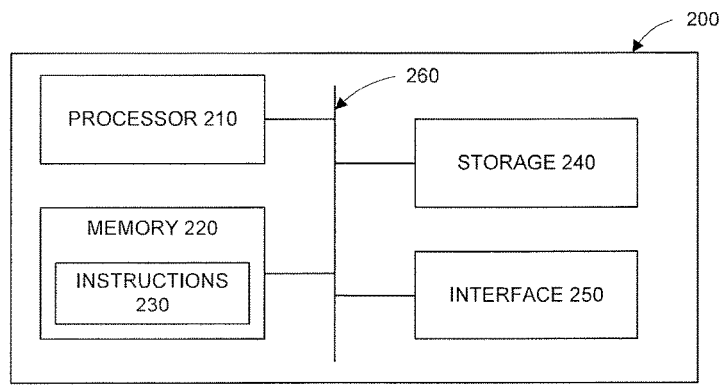
FIG. 2 illustrates an example computer system in accordance with embodiments of the present disclosure.

FIG. 2 illustrates an example computer system 200 in accordance with embodiments of the present disclosure. One or more aspects of computer system 200 may be used in user devices 110, components of network 120, issuer server 130, database 135, or merchant server 140 of FIG. 1. For example, each of user devices 110, issuer server 130, and merchant server 140 may include a computer system 200. As another example, in some embodiments, one or more of user devices 110, issuer server 130, and merchant server 140 may include a plurality of computer systems 200.

Computer system 200 may include a processor 210, memory 220 comprising instructions 230, storage 240, interface 250, and bus 260. These components may work together to perform one or more steps of one or more methods (e.g. method 500 of FIG. 5) and provide the functionality described herein. For example, in particular embodiments, instructions 230 in memory 220 may be executed on processor 210 in order to process requests received by interface 250 using common function modules. In certain embodiments, instructions 230 may reside in storage 240 instead of, or in addition to, memory 220.

Processor 210 may be a microprocessor, controller, application specific integrated circuit (ASIC), or any other suitable device or logic operable to provide, either alone or in conjunction with other components (e.g., memory 220 and instructions 230) functionality according to the present disclosure. Such functionality may include processing application functions using remotely-located common function modules, as discussed herein. In particular embodiments, processor 210 may include hardware for executing instructions 230, such as those making up a computer program or application. As an example and not by way of limitation, to execute instructions 230, processor 210 may retrieve (or fetch) instructions 230 from an internal register, an internal cache, memory 220, or storage 240; decode and execute them; and then write one or more results of the execution to an internal register, an internal cache, memory 220, or storage 240.

Memory 220 may be any form of volatile or non-volatile memory including, without limitation, magnetic media, optical media, random access memory (RAM), read-only memory (ROM), flash memory, removable media, or any other suitable local or remote memory component or components. Memory 220 may store any suitable data or information utilized by computer system 200, including software (e.g., instructions 230) embedded in a computer readable medium, and/or encoded logic incorporated in hardware or otherwise stored (e.g., firmware). In particular embodiments, memory 220 may include main memory for storing instructions 230 for processor 210 to execute or data for processor 210 to operate on. In particular embodiments, one or more memory management units (MMUs) may reside between processor 210 and memory 220 and facilitate accesses to memory 220 requested by processor 210.

Storage 240 may include mass storage for data or instructions (e.g., instructions 230). As an example and not by way of limitation, storage 240 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 240 may include removable or non-removable (or fixed) media, where appropriate. Storage 240 may be internal or external to computer system 200, where appropriate. In some embodiments, instructions 230 may be encoded in storage 240 in addition to, in lieu of, memory 220.

Interface 250 may include hardware, encoded software, or both providing one or more interfaces for communication (such as, for example, packet-based communication) between computer systems on a network (e.g., between user devices 110 and merchant server 140 of FIG. 1). As an example, and not by way of limitation, interface 250 may include a network interface controller (NIC) or network adapter for communicating with an Ethernet or other wire-based network and/or a wireless NIC (WNIC) or wireless adapter for communicating with a wireless network. Interface 250 may include one or more connectors for communicating traffic (e.g., IP packets) via a bridge card. Depending on the embodiment, interface 250 may be any type of interface suitable for any type of network in which computer system 200 is used. In some embodiments, interface 250 may include one or more interfaces for one or more I/O devices. One or more of these I/O devices may enable communication between a person and computer system 200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 260 may include any combination of hardware, software embedded in a computer readable medium, and/or encoded logic incorporated in hardware or otherwise stored (e.g., firmware) to communicably couple components of computer system 200 to each other. As an example and not by way of limitation, bus 260 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 260 may include any number, type, and/or configuration of buses 260, where appropriate. In particular embodiments, one or more buses 260 (which may each include an address bus and a data bus) may couple processor 210 to memory 220. Bus 260 may include one or more memory buses.

Modifications, additions, or omissions may be made to FIG. 2 without departing from the scope of the present disclosure. For example, FIG. 2 illustrates components of computer system 200 in a particular configuration. However, any configuration of processor 210, memory 220, instructions 230, storage 240, interface 250, and bus 260 may be used, including the use of multiple processors 210 and/or buses 260. In addition, computer system 200 may be physical or virtual.

FIGS. 3A-3B illustrate example token records 300 of a database in accordance with embodiments of the present disclosure. Token records 300 may be generated in a database by a token issuer, in certain embodiments. For example, referring to FIG. 1, token records 300 may be generated by issuer server 130 and stored in database 135 after tokens 115 have been generated. Token records 300 may include any suitable information associated with a generated token. For example, token records may include information associated with account numbers, identification information for one or more users of the tokens, Token record 300a of FIG. 3A illustrates example token records that are associated with financial account data, where each row includes a token record. As illustrated, token IDs 1-4 are tokens associated with a checking account, while token IDs 5-7 are tokens associated with a line of credit account. Each token of token IDs 1-4 is associated with a different user (e.g., family members using the same checking account), and each is associated with a different device (e.g., each family member's particular user device). That is, in order to use each particular token, it must be presented by the device with which it is associated. Token IDs 5-7 are associated with a subset of the users of token IDs 1-4 (e.g., parents of the family).

As shown, token IDs 1-2 do not include any token-level restrictions, while token IDs 3-7 have restrictions associated therewith. For example, token ID 3 may not be used to spend greater than $20 per day, and may not be used outside of certain geographical boundaries. Similarly, token ID 4 may not be used to spend greater than $50 per month, and may only be used at particular merchants and on particular products (which may be represented by stockkeeping units (SKUs) in certain embodiments). Each of token IDs 5-6 are similarly restricted to spending less than $500 per month.

In contrast with Token IDs 1-6, Token ID 7 is not stored on or associated with a particular user device (although it may be associated with a user device, in certain embodiments). Rather, it is associated with multiple users and is stored at Merchant1 for usage by either User1 or User2 in transactions with Merchant1, such as recurring transactions (e.g., a recurring monthly membership payment or utility payment where automatic clearing house (ACH) payments are used). Token ID 7 is therefore analogous to having financial account information "on file" with Merchant1. Accordingly, a user may store tokens at a merchant rather than their sensitive financial account or personal identification information. In certain embodiments, such tokens may or may not be associated with particular user devices. For instance, User1 or User2 may initiate the usage of token ID 7 from any user device. However, a user device association/restriction may be applied to these "on file" tokens, such as token ID 7, such that usage of the token for a transaction must be initiated from a particular user device.

Token records 300a may be used, for example, in transactions that require financial account information from a user. For example, to purchase particular items, a user may provide a token that represents their checking account information to merchant. By providing a token representing the sensitive information rather than the actual sensitive information, the transaction may be more secure since the sensitive information is not passed between the user and the merchant. The merchant may then request the appropriate financial information from the issuer (e.g., a bank) by presenting the token to the issuer for translation, as described herein. This may occur using a secured connection between the merchant and the issuer. The issuer may then provide the sensitive information after validating the token's authenticity.

Token record 300b of FIG. 3B illustrates example token records that are associated with personal identification data, where each row includes a token record. The personal identification data may include information that is similar to information contained on items such as driver's licenses, passports, social security cards, and the like. For example, as shown, token IDs 1 and 2 include social security number information (e.g., number, benefits, or the like), driver's license information (e.g., state, license number, date of birth information, or license restriction information, or the like), and passport information (e.g., number, country, date of birth information, passport stamp information, or the like) for User1 and User2, respectively. Token IDs 3 and 4, however, merely include social security information and passport information.

Token records 300b, for example, may be used in transactions that require identification information from a user. For example, to purchase particular items (e.g., alcohol or tobacco), a user may provide a token that represents their date of birth information for age verification by the merchant. By providing a token representing the sensitive information rather than the actual sensitive information, the transaction may be more secure.

Modifications, additions, or omissions may be made to FIGS. 3A-3B without departing from the scope of the present disclosure. For example, FIGS. 3A-3B illustrate particular configurations of token records 300 that contain particular types of sensitive personal data. However, token records 300 may include any suitable information associated with tokens that is sensitive in nature.

FIGS. 4A-4B illustrate example user interfaces 400 associated with token records (e.g., token records 300 of FIGS. 3A-3B) in accordance with embodiments of the present disclosure. User interfaces 400 may be interfaces displayed to a user associated with the token records (e.g., the tokens directly associated with the user or his accounts), and may include any suitable information associated with the token records. Furthermore, user interfaces may display information to a user regarding tokens with which the user is not directly associated, but may be indirectly associated. For example, a user may be associated with one or more family members' tokens and may accordingly be able to view information about such tokens through user interfaces 400. For example, user interfaces 400 may display token owner information (e.g., the owner of each token with which the user is directly or indirectly associated), user device association information (e.g., a device identifier), account association information (e.g., the financial account or type of financial account with which the token is associated), token restriction information (e.g., merchant, SKU, or geographical limitations on usage of the particular token), token usage information (e.g., transaction histories), or merchant association information (e.g., which merchants may have a copy of the token "on file"). User interfaces 400 may be displayed to a user upon logging into an online account associated with the tokens, for example.

FIG. 4A, for instance, illustrates an example user interface 400*a* that displays token information for four tokens associated with three different users, along with transaction information for a particular token of the four tokens (i.e., Token1). Similarly, FIG. 4B illustrates an example user interface 400*b* that displays token information for four tokens associated with three different users, along with merchant association information for a particular token of the four tokens (i.e., Token2).

User interfaces also include "Refresh" and "Delete" buttons, which may allow a user to initiate a process for providing a new token or for deleting a token, respectively. For example, referring to the "Refresh" button, a user may request that a new token be issued in place of an already issued token. This may be done, for example, if the user suspects that the token has somehow been compromised. Referring to FIG. 4A, the user may request that a new token be issued in place of Token ID 1, which is associated with a checking account and Device1234. The issuer of the token may accordingly issue a new token in place of the previously-issued token, remove records associated with the previously-issued token, and create a token record associated with the newly-issued token. As another example, referring to the "Delete" button, a user may request that a previously-issued token be deleted from the device with which it is associated and/or have its associated token record deleted. This may be done, for example, if the user loses her device or otherwise will no longer user the device. This may also be done selectively for particular merchants with which the token is stored, such as when the user cancels a membership with the merchant and no longer wishes to store their token with the merchant. Referring to FIG. 4B, the user may wish that Token ID 2 be deleted from all or some of Merchant1, Merchant2, Merchant3, or Merchant4.

Modifications, additions, or omissions may be made to FIGS. 4A-4B without departing from the scope of the present disclosure. For example, FIGS. 4A-4B illustrate particular combination of certain information displayed in user interfaces 400. However, any suitable information or combination thereof may be displayed in user interfaces 400.

Figure 5:
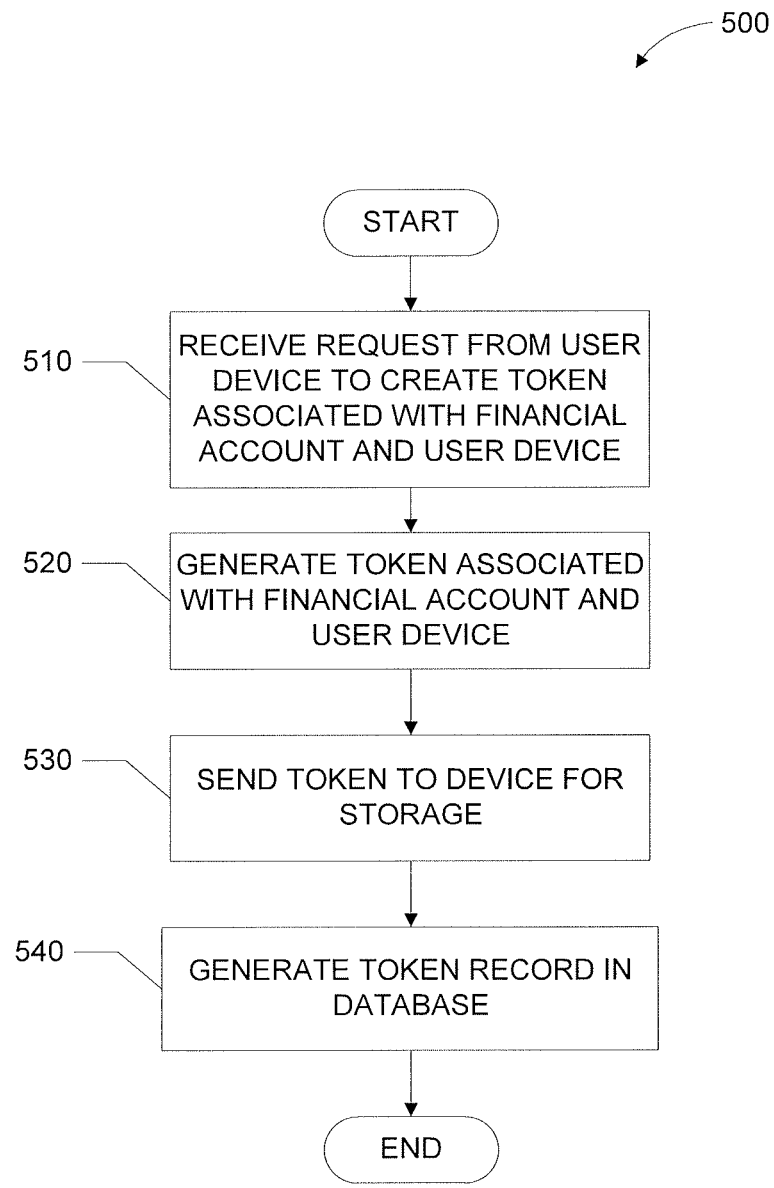
FIG. 5 illustrates an example method for generating account tokens and token records in accordance with embodiments of the present disclosure.

FIG. 5 illustrates an example method 500 for generating account tokens and token records in accordance with embodiments of the present disclosure. The method begins at step 510, where a request to create a token is received. The request may be a request to create a token associated with a particular account, such as a financial account (e.g., a checking account). In addition, the request may be a request to create a token associated with a particular device. For example, referring to FIG. 1, a request to create a token may be received at issuer server 130, with the request being to create token 115*d* that is associated with user device 110*d* and with a particular user account.

At step 520, a token may be generated in response to the request received at step 510. The token may be associated with a particular account and user device. Using the above example, token 115*d* may be generated by issuer server 130, and token 115*d* may be uniquely associated with user device 110*d* (i.e., token 115*d* may only be allowed to be used in a transaction if sent from user device 110*d*) and with a particular user account. Next, at step 530, the token is sent to the user device for storage. Using the same example, token 115*d* may be sent to user device 110*d* for storage in wallet 111*d* after being generated by issuer server 130.

Finally, at step 540, a token record associated with the token is generated. The token record may be generated by a server and stored in a database, for instance. Referring to the above example, the token record may be generated by issuer server 130 and stored in database 135. The token record may include any suitable information about the generated token, and may be similar to one or more of token records 300*a* of FIG. 3A. As the token is used by the user device, the token record may be updated. For example, usage history (e.g., transaction history) associated with the token may be stored in the database. As another example, as token information is updated, the corresponding information in the database may be updated as well.

Modifications, additions, or omissions may be made to method 500 without departing from the scope of the present disclosure. For example, the order of the steps may be performed in a different manner than that described and some steps may be performed at the same time. Additionally, each individual step may include additional steps without departing from the scope of the present disclosure.

Figure 6:
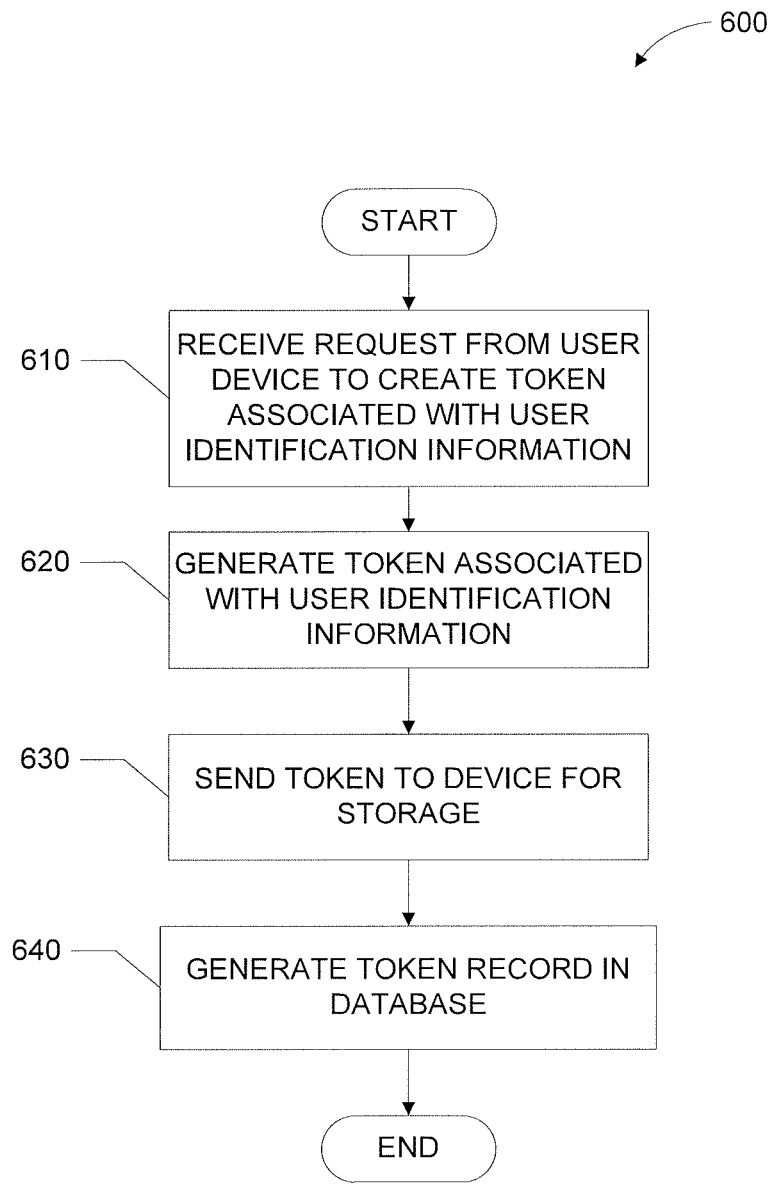
FIG. 6 illustrates an example method for generating identification tokens and token records in accordance with embodiments of the present disclosure.

FIG. 6 illustrates a method 600 for generating identification tokens and token records in accordance with embodiments of the present disclosure. The method begins at step 610, where a request to create a token is received. The request may be a request to create a token associated with a user's identification information, such as driver's license information, social security information, passport information, or the like. In addition, the request may be a request to create a token associated with a particular device. For example, referring to FIG. 1, a request to create a token may be received at issuer server 130, with the request being to create token 115*d* that is associated with user device 110*d* and with particular user identification information.

At step 620, a token may be generated in response to the request received at step 610. The token may be associated with the user identification information and a user device. Using the above example, token 115*d* may be generated by issuer server 130, and token 115*d* may be uniquely associated with user device 110*d* (i.e., token 115*d* may only be allowed to be used in a transaction if sent from user device 110*d*) and with particular user identification information. Next, at step 530, the token is sent to the user device for storage. Using the same example, token 115*d* may be sent to user device 110*d* for storage in wallet 111*d* after being generated by issuer server 130.

Finally, at step 540, a token record associated with the token is generated. The token record may be generated by a server and stored in a database, for instance. Referring to the above example, the token record may be generated by issuer server 130 and stored in database 135. The token record may include any suitable information about the generated token, and may be similar to one or more of token records 300*b* of FIG. 3B. As the token is used by the user device, the token record may be updated. For example, usage history (e.g., transaction history) associated with the token may be stored in the database. As another example, as token information is updated, the corresponding information in the database may be updated as well.

Modifications, additions, or omissions may be made to method 600 without departing from the scope of the present disclosure. For example, the order of the steps may be performed in a different manner than that described and some steps may be performed at the same time. Additionally, each individual step may include additional steps without departing from the scope of the present disclosure.

Figure 7:
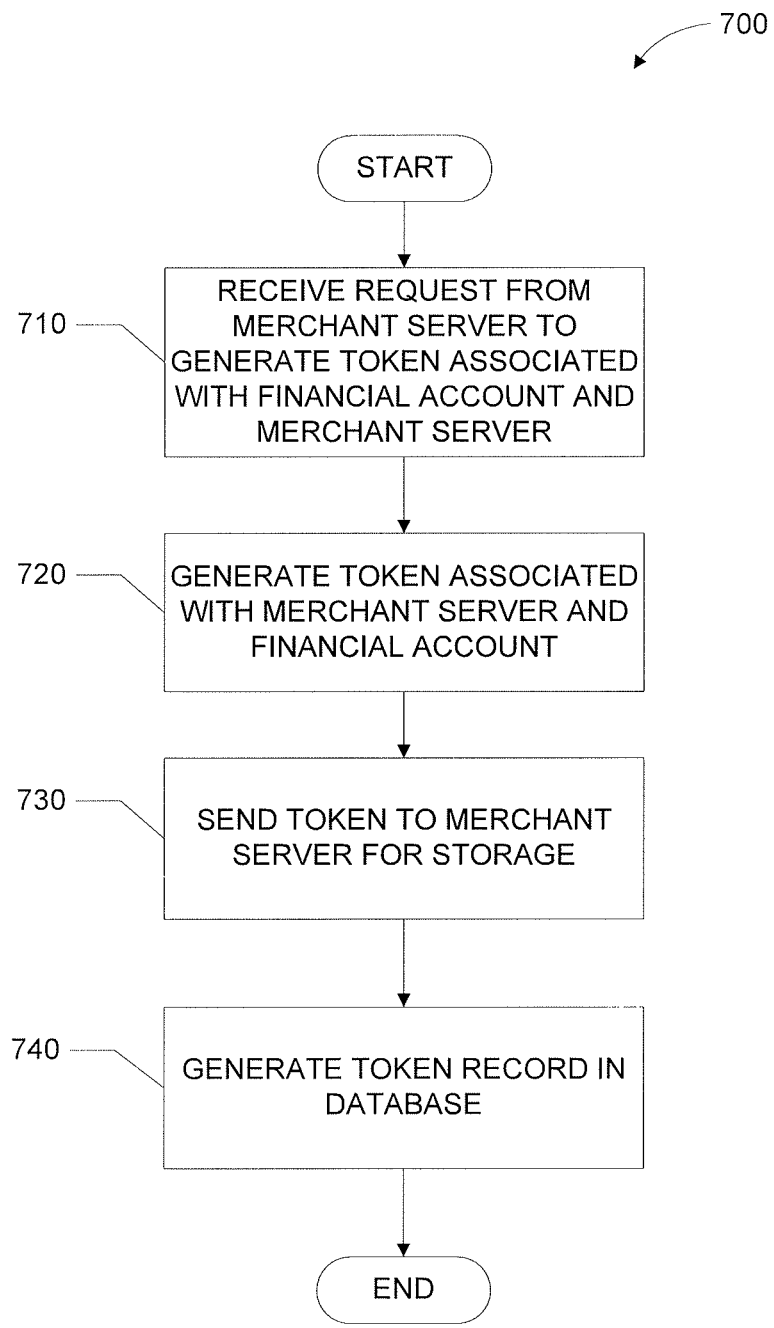
FIG. 7 illustrates an example method for storing user tokens at a merchant server in accordance with embodiments of the present disclosure.

FIG. 7 illustrates an example method 700 for storing user tokens at a merchant server in accordance with embodiments of the present disclosure. The method begins at step 710, where a request is received from a merchant server to generate a token associated with a user account and the merchant server. The request may be initiated by a user device associated with the user account (i.e., the user device requests that the merchant server store a token "on file"). The user account with which the token is associated may include financial account information (e.g., checking account information), in certain embodiments. For example, the merchant server may store the token associated with the financial account information in lieu of storing the actual financial account information (e.g., storing the financial account information "on file"). Referring to FIG. 1, this step may include merchant server 140 requesting that issuer server 130 generate a token 145 that is associated with a financial account of a user associated with user device 110b and/or 110c.

At step 720, a token may be generated in response to the request received at step 710. The token may be associated with a particular user account and the merchant server, in certain embodiments. Using the above example, a token 145 may be generated by issuer server 130, and the token 145 may be uniquely associated with merchant server 140 (i.e., token 145 may only be allowed to be used if sent from merchant server 140) and with a particular user account associated with the merchant server 140. Next, at step 730, the token is sent to the merchant server for storage. Using the same example, token 145 may be sent to merchant server 140 for storage in wallet 141 after being generated by issuer server 130.

Finally, at step 740, a token record associated with the token is generated. The token record may be generated by a server and stored in a database, for instance. Referring to the above example, the token record may be generated by issuer server 130 and stored in database 135. The token record may include any suitable information about the generated token, and may be similar to one or more of token records 300a of FIG. 3A.

Modifications, additions, or omissions may be made to method 700 without departing from the scope of the present disclosure. For example, the order of the steps may be performed in a different manner than that described and some steps may be performed at the same time. Additionally, each individual step may include additional steps without departing from the scope of the present disclosure.

Figure 8:
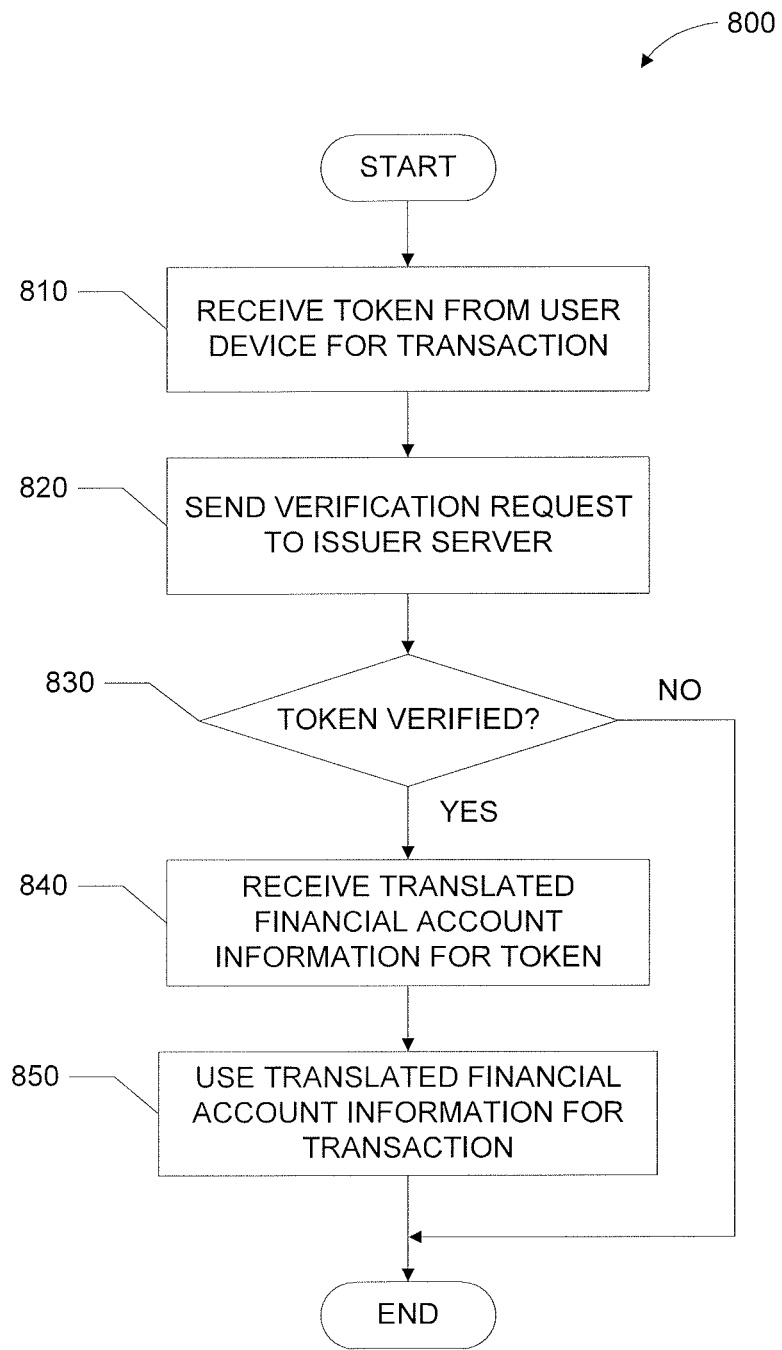
FIG. 8 illustrates an example method for performing transactions using tokens in accordance with embodiments of the present disclosure.

FIG. 8 illustrates an example method 800 for performing transactions using tokens in accordance with embodiments of the present disclosure. The method begins at step 810, where a token is received from a user device to complete a transaction. The token may be received at a merchant server, for instance. In certain embodiments, the token may represent financial account information associated with a user of the user device. As an example, the token may represent information associated with a checking account (e.g., checking account and/or routing number information). In some embodiments, the token may represent user identification information, such as driver's license information, social security information, passport information, or the like. Referring to FIG. 1, merchant server 140 may receive token 115a from user device 110a (which may have originated from wallet 111a on user device 110a) to complete a transaction.

At step 820, a verification request is sent to an issuer server in response to receiving the token at step 810. The verification request may include any suitable information associated with the transaction, such as a merchant identifier, a product identifier, a price of the product, information contained in the token, and information associated with the user device that provided the token. As an example, referring again to FIG. 1, the verification request may be sent by merchant server 140 to issuer server 130. The verification request may include transaction information, the information in token 115a, and the identity of user device 110a (since it is the device that provided the token to merchant server 140).

At step 830, the issuer server may verify the token or otherwise determine whether the token is legitimate. This may include, for example, comparing the information received in the verification request from the merchant server with the token record associated with the token to determine whether the user device that provided the token matches the user device associated with the token in the token record.

If the token is verified by the issuer server, the issuer server may send translated information for the token back to the merchant server, and the translated information for the token is received at step 840. The translated information may include the exploitable sensitive information stored in the token record for which the token represented a non-exploitable version. For example, in some embodiments, the translated information may include financial account information such as checking account information (e.g., the account number or routing number) or credit account information. In some embodiments, the translated information may include user identification information. In certain embodiments, the translated information may include a combination of financial account information and user identification information.

Finally, at step 850, the translated information is used to complete the transaction. Where the translated information is financial account information, this may include using the financial account information for payment, for instance. Similarly, where the translated information is user identification information, this may include using the user identification information for identification verification purposes, for instance.

Modifications, additions, or omissions may be made to method 800 without departing from the scope of the present disclosure. For example, the order of the steps may be performed in a different manner than that described and some steps may be performed at the same time. Additionally, each individual step may include additional steps without departing from the scope of the present disclosure.

Figure 9:
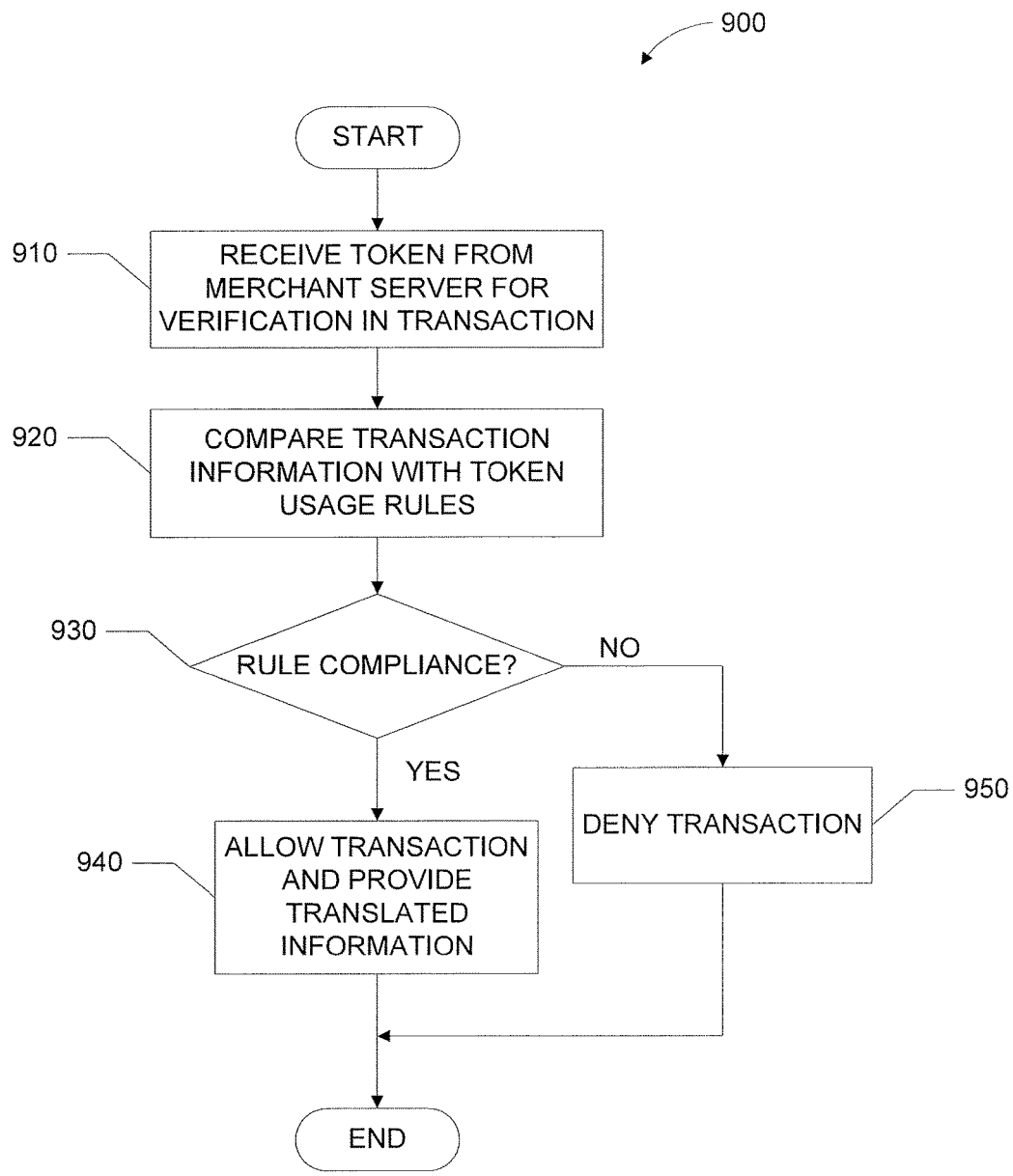
FIG. 9 illustrates an example method for generating alerts associated with token usage in accordance with embodiments of the present disclosure.

FIG. 9 illustrates an example method 900 for generating alerts associated with token usage in accordance with embodiments of the present disclosure. The method begins at step 910, where a token is received at an issuer server from a merchant server. In certain embodiments, the token may be sent to the issuer server by the merchant server for verification in the course of a transaction. For example, referring to FIG. 1, merchant server 140 send the token 115a to issuer serer 130 for verification after having received token 115a from user device 110a during the course of a transaction. The verification request may include any suitable information associated with the transaction, such as a merchant identifier, a product identifier, a price of the product, a geographical location of the transaction, information contained in the token, and information associated with the user device that provided the token.

At step 920, the information associated with the transaction is compared with one or more token usage rules. The token usage rules may be associated with the particular token used in the transaction, and may accordingly be unique to the particular token. The token usage rules may comprise any suitable rules or restrictions for usage of the token. For example, in particular embodiments the token usage rules may comprise one or more rules indicating geographical locations in which transactions may or may not be performed using the token, one or more rules indicating products for which transactions may or may not be performed using the token, one or more rules indicating monetary amounts over which transactions may not be performed using the token, or a combination thereof.

At step 930, it is determined, based on the comparison of step 920, whether the transaction is within compliance of the one or more token usage rules. If so, the method proceeds to step 940, where the transaction is allowed. Otherwise, the method proceeds to step 950, where the transaction is denied and an alert is generated. The alert may be in any suitable format, including a short message system (SMS) text message, electronic mail message, a pop-up push notification message on the user device, or the like.

Modifications, additions, or omissions may be made to method 900 without departing from the scope of the present disclosure. For example, the order of the steps may be performed in a different manner than that described and some steps may be performed at the same time. Additionally, each individual step may include additional steps without departing from the scope of the present disclosure.

Figure 10:
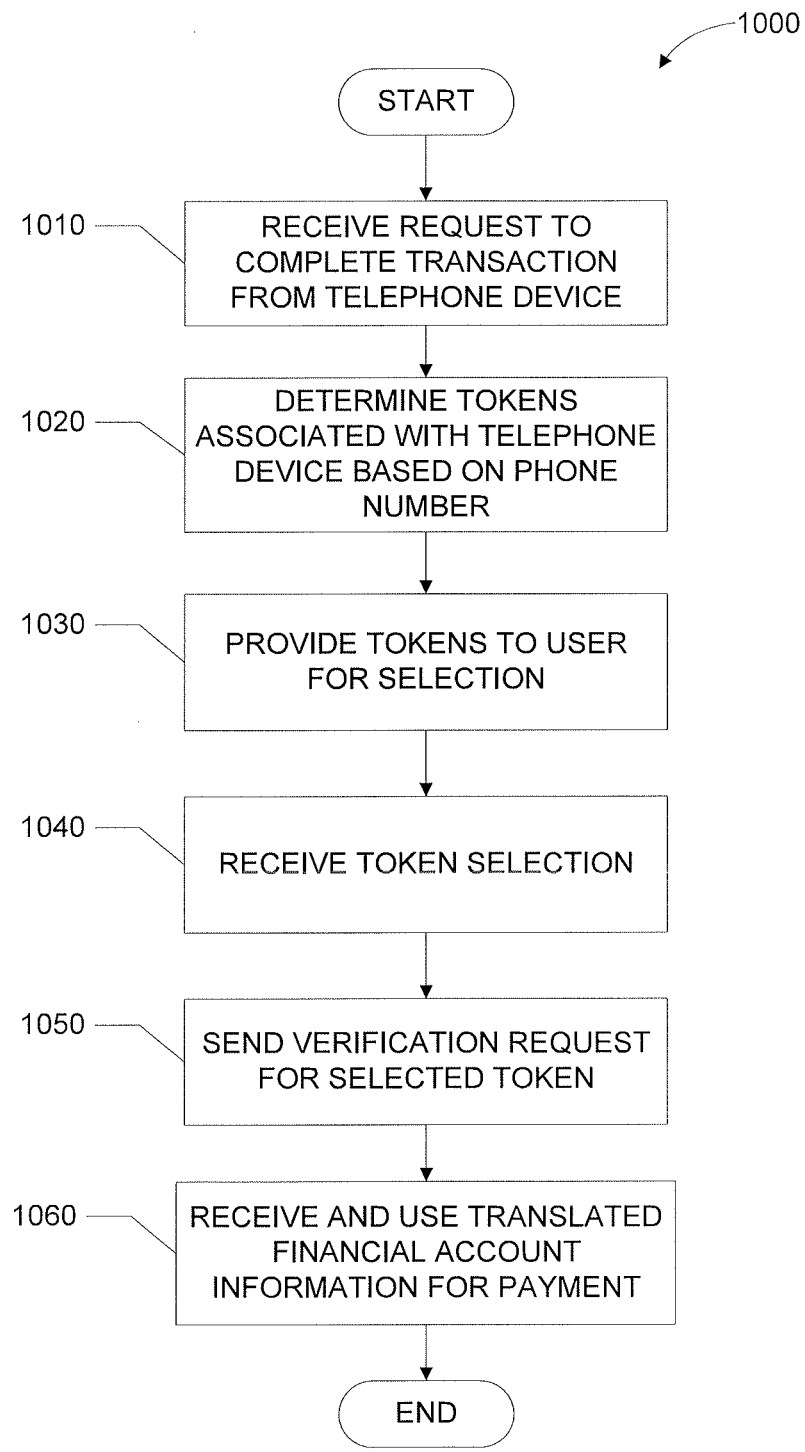
FIG. 10 illustrates an example method for using tokens in response to requests received by telephone in accordance with embodiments of the present disclosure.

FIG. 10 illustrates an example method 1000 for using tokens in response to requests received by telephone in accordance with embodiments of the present disclosure. The method begins at step 1010, where a request to complete a transaction is received from a user telephone device. The request may be received at a merchant server in any suitable format, including a request submitted via a telephone call or via a SMS message. The request may indicate that the user of the user telephone device wishes to complete the transaction using a token associated with themselves, the user telephone device, and/or the merchant that is a party to the transaction.

At step 1020, one or more tokens associated with the user, user telephone device, and/or the merchant are determined. This may be done based on the telephone number from which the request of step 1010 originated. For example, caller ID may be used for requests by telephone call to determine which tokens may be associated with the particular telephone number. As another example, metadata from SMS message requests may be used to determine which tokens may be associated with the particular telephone number.

At step 1030, the one or more tokens determined at step 1020 are provided to the user for selection therefrom, and at step 1040, a token selection (from among the one or more tokens provided for selection) is received back from the user. In certain embodiments, if only one token is determined at step 1020 to be associated with the particular telephone number, then steps 1030 and 1040 may be skipped.

At step 1050, a verification request is sent to an issuer server for the selected token. The verification request may include any suitable information associated with the transaction, such as a merchant identifier, a product identifier, a price of the product, a geographical location of the transaction, information contained in the token, and information associated with the user device that provided the token.

Finally, at step 1060 (if the token was verified by the issuer server), translated information associated with the token is received and used to complete the transaction. Where the translated information is financial account information, this may include using the financial account information for payment, for instance. Similarly, where the translated information is user identification information, this may include using the user identification information for identification verification purposes, for instance.

Modifications, additions, or omissions may be made to method 1000 without departing from the scope of the present disclosure. For example, the order of the steps may be performed in a different manner than that described and some steps may be performed at the same time. Additionally, each individual step may include additional steps without departing from the scope of the present disclosure.

Figure 11:
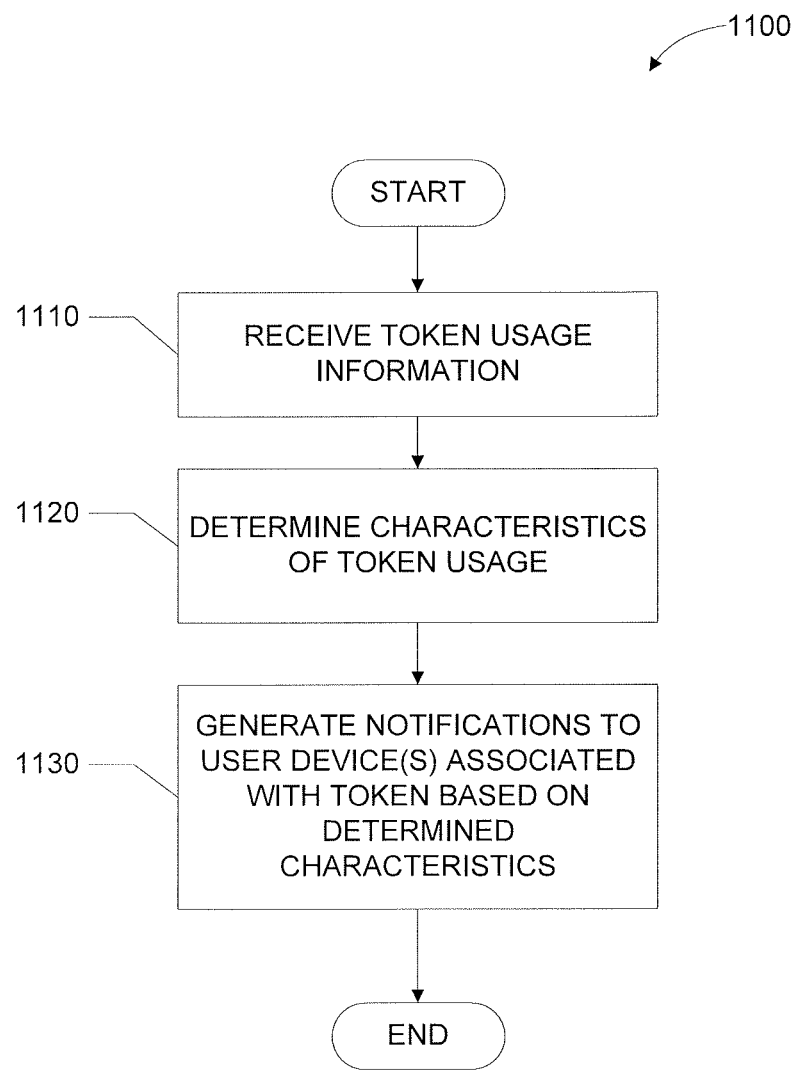
FIG. 11 illustrates an example method for generating notifications based on token usage information in accordance with embodiments of the present disclosure

FIG. 11 illustrates an example method 1100 for generating notifications based on token usage information in accordance with embodiments of the present disclosure. The method begins at step 1110, where token usage information is received. The token usage information may include any suitable information associated with a token's history. For example, the token usage history may include transactions in which the token was used (and all associated information therewith, such as the merchants, products, prices, locations, etc.).

At step 1120, one or more characteristics of the token usage information are determined. This may include, for example, merchants at which the particular token was used to complete transactions, products for which the particular token was used to complete transactions, or transactions in which the token was denied.

Finally, at step 1130, one or more notifications are generated based on the characteristics determined at step 1120. The notifications may be in any suitable format, such as SMS messages, electronic mail messages, pop-up push notification messages, or the like. In particular embodiments, the notifications may be advertisements, fraud alerts, or general usage notifications (e.g., denied transaction, usage limit reached, etc.). For example, it may be determined at step 1120 that a particular token was used many times at a particular merchant during a certain time period. Accordingly, an advertisement for the merchant (or a competitor merchant) may be sent to the user device associated with the token. The notifications may be sent to any user device associated with a particular token. For example, the notification may be sent to the user device directly associated with the token (i.e., the specific user device that may use the token for transactions), and/or to a user device indirectly associated with the token (e.g., a parent device for a child token).

Modifications, additions, or omissions may be made to method 1100 without departing from the scope of the present disclosure. For example, the order of the steps may be performed in a different manner than that described and some steps may be performed at the same time. Additionally, each individual step may include additional steps without departing from the scope of the present disclosure.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:
1. A system, comprising:
a memory comprising instructions;
an interface configured to receive, from a user telephone device, a request to complete a transaction using a token;

a processor communicatively coupled to the memory and
the interface, the processor configured, when executing
the instructions, to:
use caller ID to detect a telephone number of the
telephone device;
determine one or more tokens based on the detected
telephone number;
wherein the interface is further configured to:
provide the one or more tokens to the telephone device;
receive, from the telephone device, a first token selection indicating that a first selected token of the one or more tokens has been compromised and should be refreshed;
in response to the first token selection, remove the first token and issue a new token in place of the first token;
receive, from the telephone device, a second token selection indicating a second selected token of the one or more tokens;
send, to an issuer server, a verification request for the second selected token, wherein usage of the second selected token is verified against one or more rules indicating a geographical boundary outside of which the second selected token may not be used, wherein the issue server is configured to generate a token record and store the token record in a database, the token record comprising:
a first token identifier for the first selected token, an account identifier for an account corresponding to the first selected token, a device identifier for the telephone device, a user identifier for a user of the telephone device, an account type for the account corresponding to the first selected token, a restriction on usage of the first selected token, a merchant identifier for a merchant corresponding to the first selected token, and a history of transactions that used the first selected token; and
a second token identifier for the second selected token, an account identifier for an account corresponding to the second selected token, a device identifier for the telephone device, a user identifier for a user of the telephone device, an account type for the account corresponding to the second selected token, a restriction on usage of the second selected token, a merchant identifier for a merchant corresponding to the second selected token, and a history of transactions that used the second selected token; and
receive, in response to the verification request, translated information associated with the second selected token; and
wherein the processor is further configured to complete the transaction using the translated information.

2. The system of claim 1, where the second selected token comprises a non-exploitable representation of the translated information.

3. The system of claim 1, wherein the request is received via a telephone call that includes the user telephone device.

4. The system of claim 1, wherein the request is received via a short message service (SMS) text message sent from the user telephone device.

5. The system of claim 1, wherein the token is associated with financial account information.

6. A method, comprising:
receiving, from a user telephone device, a request to complete a transaction using a token;
using caller ID to detect a telephone number of the telephone device;
determining one or more tokens based on the detected telephone number;
providing the one or more tokens to the telephone device;
receiving, from the telephone device, a first token selection indicating that a first selected token of the one or more tokens has been compromised and should be refreshed;
in response to the first token selection, removing the first token and issue a new token in place of the first token;
receiving, from the telephone device, a second token selection indicating a second selected token of the one or more tokens;
sending, to an issuer server, a verification request for the second selected token, wherein usage of the second selected token is verified against one or more rules indicating a geographical boundary outside of which the second selected token may not be used, wherein the issue server is configured to generate a token record and store the token record in a database, the token record comprising:
a first token identifier for the first selected token, an account identifier for an account corresponding to the first selected token, a device identifier for the telephone device, a user identifier for a user of the telephone device, an account type for the account corresponding to the first selected token, a restriction on usage of the first selected token, a merchant identifier for a merchant corresponding to the first selected token, and a history of transactions that used the first selected token; and
a second token identifier for the second selected token, an account identifier for an account corresponding to the second selected token, a device identifier for the telephone device, a user identifier for a user of the telephone device, an account type for the account corresponding to the second selected token, a restriction on usage of the second selected token, a merchant identifier for a merchant corresponding to the second selected token, and a history of transactions that used the second selected token;
receiving, in response to the verification request, translated information associated with the second selected token; and
completing the transaction using the translated information.

7. The method of claim 6, where the second selected token comprises a non-exploitable representation of the translated information.

8. The method of claim 6, wherein the request is received via a telephone call that includes the user telephone device.

9. The method of claim 6, wherein the request is received via a short message service (SMS) text message sent from the user telephone device.

10. The method of claim 6, wherein the token is associated with financial account information.

11. A computer-readable medium comprising instructions that are configured, when executed by a processor, to:
receive, from a user telephone device, a request to complete a transaction using a token;
use caller ID to detect a telephone number of the telephone device;
determine one or more tokens based on the detected telephone number;
provide the one or more tokens to the telephone device;

receive, from the telephone device, a first token selection indicating that a first selected token of the one or more tokens has been compromised and should be refreshed;

in response to the first token selection, remove the first token and issue a new token in place of the first token;

receive, from the telephone device, a second token selection indicating a second selected token of the one or more tokens;

send, to an issuer server, a verification request for the second selected token, wherein usage of the second selected token is verified against one or more rules indicating a geographical boundary outside of which the second selected token may not be used, wherein the issue server is configured to generate a token record and store the token record in a database, the token record comprising:

a first token identifier for the first selected token, an account identifier for an account corresponding to the first selected token, a device identifier for the telephone device, a user identifier for a user of the telephone device, an account type for the account corresponding to the first selected token, a restriction on usage of the first selected token, a merchant identifier for a merchant corresponding to the first selected token, and a history of transactions that used the first selected token; and a second token identifier for the second selected token, an account identifier for an account corresponding to the second selected token, a device identifier for the telephone device, a user identifier for a user of the telephone device, an account type for the account corresponding to the second selected token, a restriction on usage of the second selected token, a merchant identifier for a merchant corresponding to the second selected token, and a history of transactions that used the second selected token;

receive, in response to the verification request, translated information associated with the second selected token; and complete the transaction using the translated information.

12. The computer-readable medium of claim 11, where the second selected token comprises a non-exploitable representation of the translated information.

13. The computer-readable medium of claim 11, wherein the request is received via a telephone call that includes the user telephone device.

14. The computer-readable medium of claim 11, wherein the request is received via a short message service (SMS) text message sent from the user telephone device.

* * * * *

UNITED STATES PATENT AND TRADEMARK OFFICE
CERTIFICATE OF CORRECTION

| | |
|---|---|
| PATENT NO. | : 10,528,939 B2 |
| APPLICATION NO. | : 14/884950 |
| DATED | : January 7, 2020 |
| INVENTOR(S) | : Zafer Mohamed |

It is certified that error appears in the above-identified patent and that said Letters Patent is hereby corrected as shown below:

On the Title Page

Under item (73), under ASSIGNEE, please delete "Bank of American Corporation" and please insert -- Bank of America Corporation --, therefor.

Signed and Sealed this
Seventh Day of February, 2023

Katherine Kelly Vidal
*Director of the United States Patent and Trademark Office*